US 6,621,516 B1

(12) United States Patent
Wasson et al.

(10) Patent No.: US 6,621,516 B1
(45) Date of Patent: Sep. 16, 2003

(54) PANORAMIC PIPE INSPECTOR

(76) Inventors: Thomas Wasson, 4750 Freeport Bay, Roswell, GA (US) 30075; Susanne M Montemayor, 342 N. 2nd St., San Jose, CA (US) 95112; Robert S. Smith, 1263 Emory St., San Jose, CA (US) 95126

( * ) Notice: Subject to any disclaimer, the term of this patent is extended or adjusted under 35 U.S.C. 154(b) by 367 days.

(21) Appl. No.: 09/621,992

(22) Filed: Jul. 21, 2000

Related U.S. Application Data

(60) Provisional application No. 60/183,621, filed on Feb. 18, 2000.

(51) Int. Cl.$^7$ .................................................. H04N 7/18
(52) U.S. Cl. ........................ 348/84; 348/36; 356/241.1; 396/19
(58) Field of Search ............................. 348/36, 84, 85; 356/241.1; 396/19; H04N 7/18

(56) References Cited

U.S. PATENT DOCUMENTS

| | | | | |
|---|---|---|---|---|
| 3,557,674 A | * | 1/1971 | Carney ........................ | 396/19 |
| 3,621,767 A | * | 11/1971 | Hyzer et al. ................... | 396/19 |
| 5,563,650 A | * | 10/1996 | Poelstra ........................ | 348/36 |
| 5,654,795 A | * | 8/1997 | Dierlam ................... | 356/241.1 |
| 5,670,935 A | * | 9/1997 | Schofield et al. ........... | 348/148 |
| 5,754,220 A | * | 5/1998 | Smalser ........................ | 348/84 |
| 5,920,337 A | * | 7/1999 | Glassman et al. ............ | 348/36 |

* cited by examiner

*Primary Examiner*—Howard Britton
(74) *Attorney, Agent, or Firm*—Robert Samuel Smith

(57) ABSTRACT

A system for securing image data of an environment including a camera having a panoramic lens mounted on a cart. In one embodiment, the motor mounted on the cart is battery operated so that the cart is self contained. In one embodiment, the cart is mounted on a pair of caterpillar treads, each tread having its own motor controlled to drive the motor forward, backward or to turn. For inline inspection, such as the inside of a pipe, the camera is mounted on the cart by cantilevered legs that permit adjusting the height of the camera above the surface supporting the cart (the interior surface of the pipe and maintains the axis of the panoramic lens parallel with the pipe. In other versions, the cart is equipped to form images of pipe whose interior surface has been penetrated by phospohescent laced water that weeps from outside the pipe into the pipe interior. In another embodiment, the inside surface of pipe is sprayed with a laccquer containing phosphorescent-ferromagnetic particles that coalesce along the edges of discontinuities in the pipe surface. In yet another embodiment, the cart and camera are encased in a water tight seal and with only the caterpilar treads mounted on wheels protrucint from the housing and the camera is encased in a water tight container. The caterpillar tread is equipped with flippers that lay down when the wheels supporting the tread turn in one direction but which are free to stand up when the tread is movved in the opposite direction. The flippers are lockable in either direction.

32 Claims, 5 Drawing Sheets

PANORAMIC PIPE INSPECTOR

RELATED APPLICATIONS

This application is a non-provisional application of provisional application No. 60/183,621 filed Feb. 18, 2000 from which priority is claimed.

FIELD OF THE INVENTION

This invention relates to devices for forming images of the inside of a pipe and particularly to a panoramic camera mounted on a cart that travels inside the pipe and transmits pictures to an above ground station.

PRIOR ART AND INFORMATION DISCLOSURE

Inspection and repair of pipe, particularly underground pipe, has a number of complications.

One complication is that a break in the pipe is often not discovered until the break has a been enlarged to the extent that a substantial amount of leakage/damage has occurred. A characteristic of the problem is that a only a small length of the pipe has deteriorated and the remaining length of the pipe is in good condition and has many years of life remaining. Therefore the use of devices for inspecting the interior of the pipe to detect the beginning of a break and determining its location have been disclosed as a way of conducting preventative maintenance and replacing short sections of pipe to prevent later more expensive incidents.

U.S. Pat. No. 3,557,674 to Carney discloses a small capsule that is fitted in pipes at least as mall as eight inches diameter. A Line has one end attache to the capsule and extends to a control station at an open end of the pipe for pulling the pipe through the pipe. The capsule holds a single frame 35 mm. camera mounted in a generally cylindrical capsule with a strobe light, electric drive motor with battery for advancing the frames of the film. A pair of wires connected the capsule to the control station for controlling the strobe light and frame advance. This arrangement requires that the pipe have two open accessible ends and at least a snake for positioning the rope inside the pipe.

U.S. Pat. No. 3,621,767, to Hyzer discloses a cylindrical housing containing a camera and mounted on a pair of runners. A tow rope has one end attached to a front end of the housing and extends to the forward opening of the pipe. A second rope has two ends accessible at the rearward opening of the pipe and a middle section of the second rope looped around a pulley wheel mounted on the rearward end of the housing. The device is moved through the pipe by pulling on the tow rope. Location of the device in the pipe for correlation with pictures taken with the camera is accomplished by correlating the length of the tow rope extending into the pipe. Slack in the tow rope that would introduce positioning errors is prevented by maintaining the second rope in a taut condition.

U.S. Pat. No. 5,754,220 to Smalser discloses a portable apparatus for inspecting interior of a pipe comprising a battery operated television camera connected to one end of a coaxial cable adapted to be stored on a rotatable storage drum. The camera is mounted in a cylindrical housing and is manually pushed into the cable.

All of the above disclosures require positioning a tow rope in the pipe which requires that the pipe have two open accessible ends. They are not adaptable, example to a situation where the pipe is very long or where there is a blockage in the pipe, a bend in the pipe or a collapsed section of pipe.

Another disadvantage of the cited art is that the devices are generally restricted to a narrow range of small pipe diameters, (less than eight inches). The limitation of small diameter occurs because the line of sight of the camera lens is at a fixed distance from the supporting area of the interior pipe surface In addition to the problem of correlating the picture recorded to the position of the camera inside the pipe, there is additionally the problem imposed by the special condition imposed by the geometry of the pipe, i.e., producing an image that shows the entire circumferential band surface of a length of pipe.

In this regard U.S. Pat. No. 5,654,795 to Dierlam discloses a visual inspection apparatus for viewing welds between pipe sections. A TV camera is aimed along the centerline of the apparatus and pipeline and a mirror reflects the image of a portion of of the weld into the lens of the camera. The mirror can be rotated to allow the entire circumference of the weld to be inspected. The camera is connected by a cable to a video monitor and/or a VCR exterior to the pipe. The surface of the pipe is illuminated by a source of light transmitted through a light pipe.

U.S. Pat. No. 5,920,337 to Glassman et al discloses an omnidirectional visual image detector and processor (incorporation herein by reference). There is described a reflective rotund lens (either a cone or spherical section) which reflects the object beam from a surrounding view (encircling the lens) to a direction parallel to the axis of the rotund lens. The beam then passes through an objective lens and is focussed onto a CCD (charge coupled device) where image data is detected and processed for storage or image presentation on a monitor.

SUMMARY OF THE INVENTION

It is an object of this invention to provide a device and method for recording an image of the interior of a pipe at continuous locations along the length of the pipe even where the pipe is very long, or has a blockage such as a right angle bend or is otherwise inaccessible from both ends of the pipe.

It is another object that the image at each location be a view of the entire circumferential area of the interior surface.

It is another object that the image be presented to the operator in real time and will be seen on an analog TV monitor with a built in VCR to record real time data.

It is yet another object that the device be adaptable to us with pipe having a diameter that occurs in a large range of diameters, specifically from 6 inches to 30 inches.

This invention is directed toward a video camera that is mounted on a self powered cart In one embodiment, the cart is mounted on a pair of caterpillar treads that are particularly adaptable to rolling over some obstacles that would otherwise block movement of the cart.

In one embodiment, the camera is mounted on the forward end of the cart by a cantilever that is adjustable so that the line of sight of the camera is coincident with the centerline of the pipe for pipe that has a diameter falling in a range of diameters, (e.g., 8 inches to 30 inches). The cart is provided with a transmitter and antenna that transmits image data from the cart back to a receiver at the open end of the pipe. Control signals such as forward-backward, picture format, etc., can also be transmitted from a computer monitor at the open pipe end to the cart.

In another embodiment, the support of the camera on the cart is adapted to permit orientation of the central axis of a panoramic lens in a direction that is perpendicular to the motion of the cart.

In another embodiment, the support of the camera is adapted to orient the axis of the panoramic lens in any direction between vertical or perpendicular to the direction of motion of the cart.

These adaptations permit panoramic viewing of surroundings of the cart that is sent into otherwise inaccessible locations such as long passageways between collapsed walls or floors of buildings that have been subjected to earthquakes or fires.

DESCRIPTION OF A BEST MODE

Figure 1:
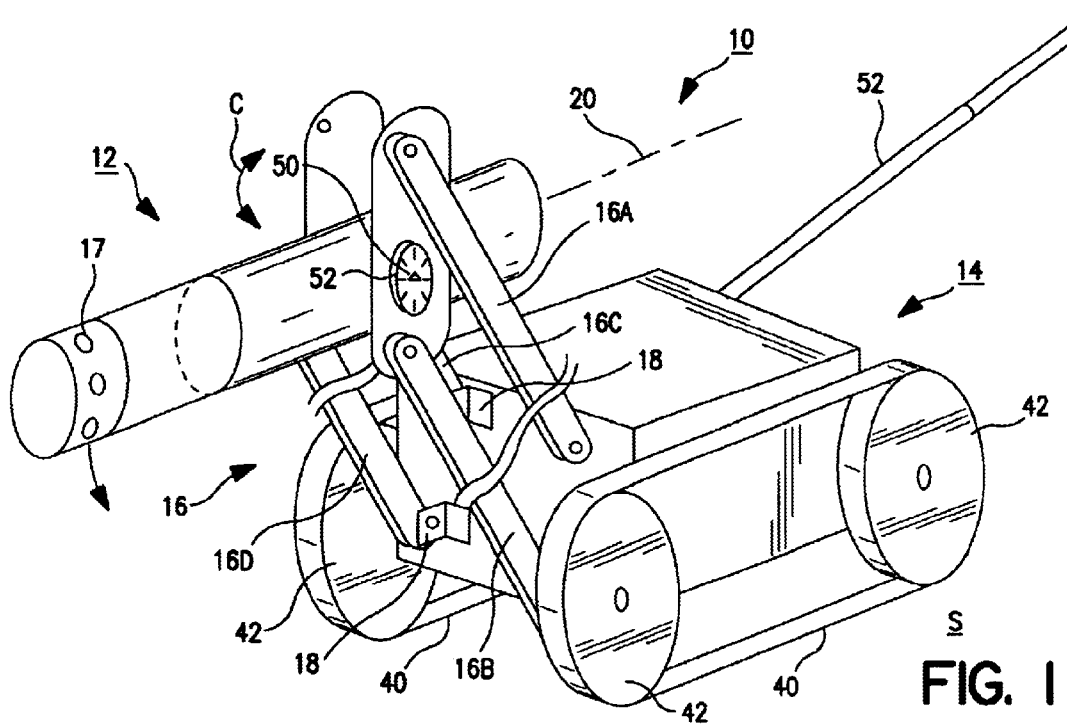
FIG. 1 is a perspective view of the cart of this invention for collecting visual information of the interior of a pipe.

Turning now to a discussion of the drawings, FIG. 1 is a perspective view showing one embodiment of the inspection system 10 of this invention including a panoramic camera 12 mounted on a cart 14, by a cantilever 16 that permits supporting the camera in the forward direction relative to the motion of the cart.

The panoramic camera 12 is the type having an array of lenses 17 and charge coupled detectors (not shown) such as described in U.S. Pat. No. 5,920,337 which is incorporated by reference into this specification.

FIG. 1 shows the camera 12 mounted on the cantilever 16 by a pin 50 so that the axis 20 of the lens can be tilted (see arrow C) with respect to the direction of travel as required. The pin 50 is the axis of a rotary actuator 52 communicating with a remote command center for selectively tilting the axis 20 of the camera 12.

Figure 2:
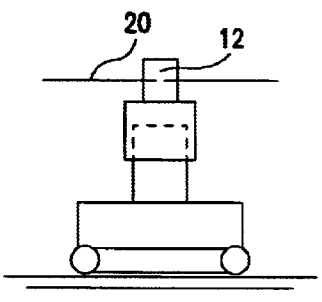
FIG. 2. is a view of the camera mounted on a telescoping support
Figure 3:
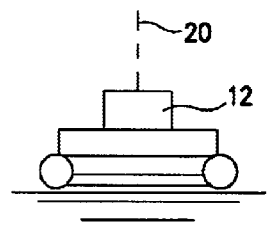
FIG. 3. is a view of the camera mounted on the cart with lens axis vertical.

For some application, the camera axis is fixed either perpendicularly to the direction of travel (FIG. 3) or parallel to the direction of travel (FIG. 2).

Figure 4:
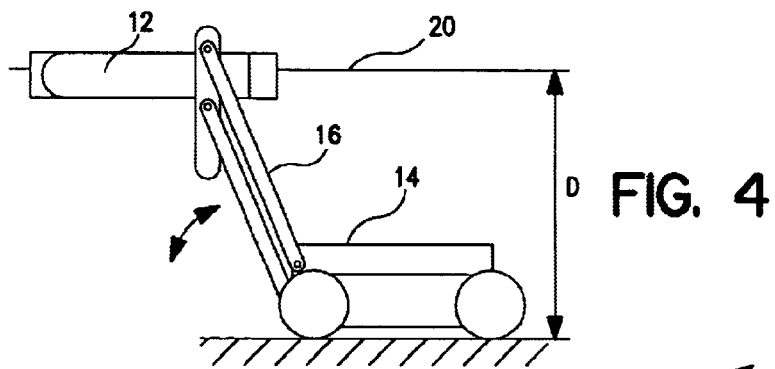
FIG. 4 shows the axix of the pipe at an adjustable elevation and parallel to the support surface.
Figure 5:
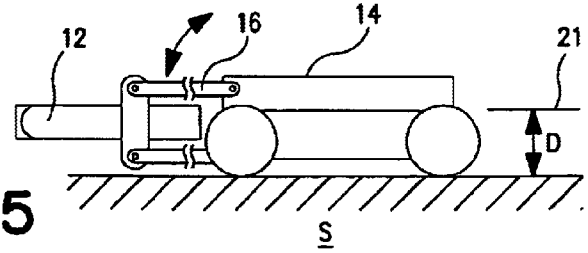
FIG. 5 shows the camera lowered to its closest distance to the support surface.

FIG. 1 shows the camera 12 mounted on cantilever legs 16 arranged so that the tilt of the camera axis 20 with respect to the the support surface S is constant regardless of the distance D from the support surface S. The cantilever 16 comprises four parallel arms 16A,B,C,D, each arm having one end hingably joined to a bracket 18 attached to the cart 14 and an opposite end attached to the camera 12. As shown in FIGS. 4 and 5, the tilt of arms 16 is selected ed to permit adjusting the height of the camera D from support surface S.

As shown in FIGS. 4, when the system is used to inspect inside a pipe, the axis 20 of the camera can be adjusted to be coincident with the centerline of the pipe within a wide range of pipe diameters.

Figure 8:
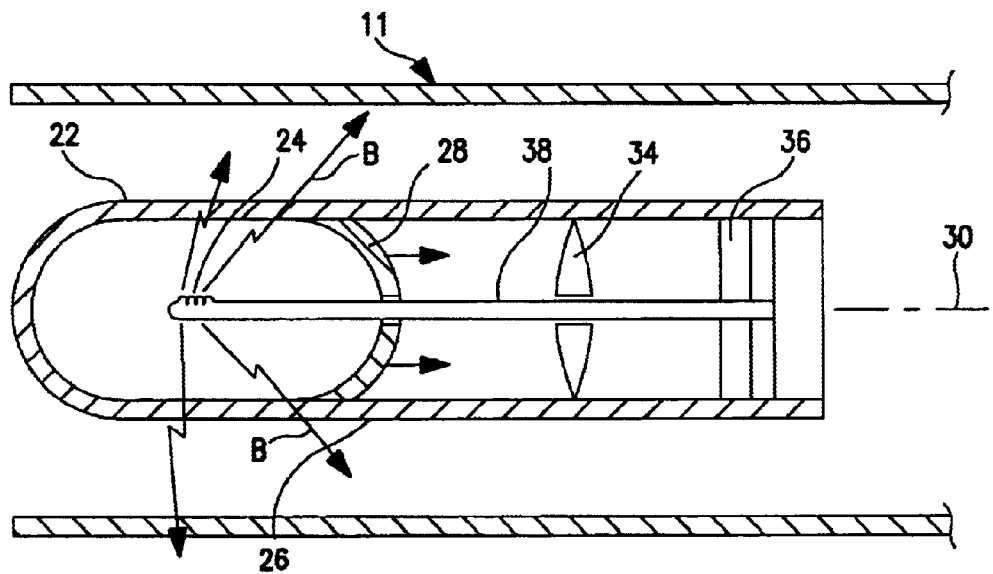
FIG. 8 shows an illuminator providing concentric illumination.

FIG. 8 is a sectional view showing an embodiment of the invention being a panoramic viewer that is especially adapted for imaging the interior surface of the pipe, 11. The superior performance resides in: providing a very uniform illumination around the inner circumference of the pipe. A cylindrical bulb 22 (with light radiating from filament 24) is mounted on an end of the hemispherical reflector 26. The bulb 22 is supported on the end of a clear plastic cylinder 26 which encloses a hemispherical reflector 32 and has an axis 30 that is parallel to the axis of the hemispherical reflector 32 and an objective lens 34. Light from filament 24 illuminates the interior surface of pipe 11 (see arrow B) so that light reflected from the pipe 11 surface passes through the clear plastic cylinder 26, is reflected by hemispherical reflector 28, is focussed by objective lens 34 and is focussed onto charge coupled device surface 36.

The electrical wires 38 for energizing the filament 24 lead along the axis of the camera through openings in the center of the reflector 28 and CCD. An advantage of this arrangement is that the wires 28 to the filament 24 do not cast a shadow that would otherwise interfere with formation of the image of the pipe surface.

FIG. 1 shows the cart having four wheels. In one embodiment, the wheels are in direct contact with the base surface. In the embodiment of FIG. 1 the wheels are mounted on a pair of caterpillar treads 40. Each tread 40 extends the entire length of the cart and loops around a pair of wheels on one side of the cart 14 opposite a caterpillar tread around another pair of wheels on the opposite side of the cart 14. The caterpillar feature also permits the cart to drive over some obstacles in the pipe such as debris.

Figure 6:
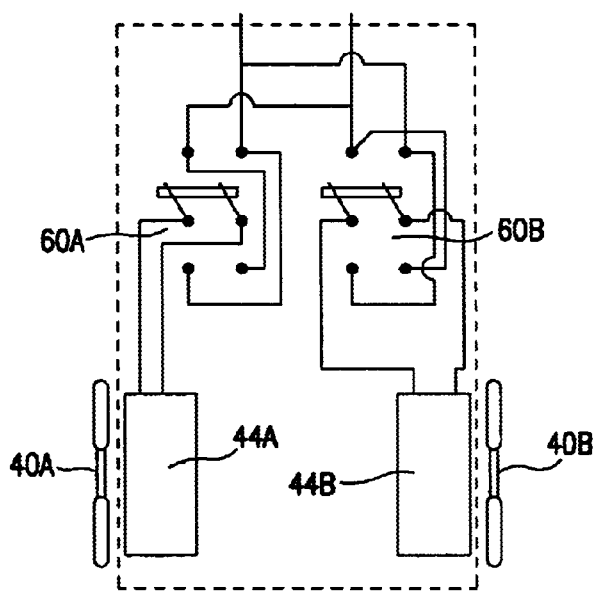
FIG. 6 shows a switching arrangement for controlling cart motion.

FIG. 6 shows an embodiment in which one pair of wheels and tread 40A are driven by one motor 44A and the other pair of wheels and tread 40B are driven by another motor 44B mounted at the other end of the cart. (The housing is not shown in FIG. 6.) The motors are preferably D.C. powered motors. FIG. 6 shows a switching circuit having a pair of switches 60A and 60B which permits both treads to be driven forward or backward simultaneously when it is required to drive the cart in the forward or backward direction.

Alternatively, one motor can drive its tread in the forward direction and the other motor can drive its tread in the rearward direction when it is required that the art turn a corner. It will be understood that the switches are part of the control means embodied in the cart and electronically controlled by position signals from the command means.

Figure 7:
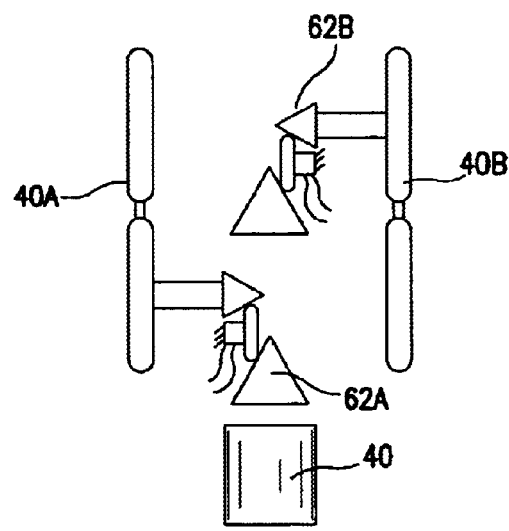
FIG. 7 shows variable transmission coupling between the motor and wheels.

FIG. 7 shows each pair of wheels 40A and 40B connected by a variable transmissions 62A and 62B to motor 40. Each variable transmission 62A and 62B is controled by electromagnetic actuators 64A and 64B respectively in response to position signals generated by a remote command means remote. (Command means not shown in FIG. 7)

FIG. 8 is a sectional view showing an embodiment of the invention being a panoramic viewer that is especially adapted for imaging the interior surface of the pipe, 11. The superior performance resides in: providing a very uniform illumination around the inner circumference of the pipe. A cylindrical bulb 22 (with light radiating from filament 24) is mounted on an end of the hemispherical reflector 26. The bulb 22 is supported on the end of a clear plastic cylinder 26 which encloses a hemispherical reflector 32 and has an axis 30 that is parallel to the axis of the hemispherical reflector 32 and an objective lens 34. Light from filament 24 illuminates the interior surface of pipe 11 (see arrow B) so that light reflected from the pipe 11 surface passes through the clear plastic cylinder 26, is reflected by hemispherical reflector 28, is focussed by objective lens 34 and is focussed onto charge coupled device surface 36.

The electrical wires 38 for energizing the filament 24 lead along the axis of the camera through openings in the center of the reflector 28 and CCD. An advantage of this arrangement is that the wires 28 to the filament 24 do not cast a shadow that would otherwise interfere with formation of the image of the pipe surface.

Figure 9:
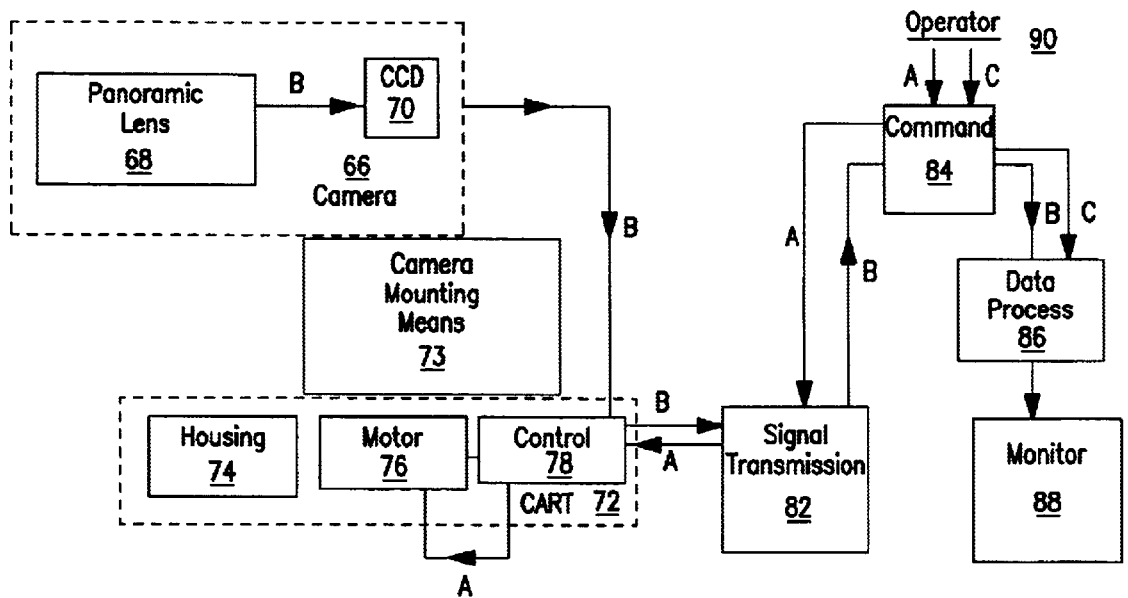
FIG. 9 is a schematic diagram using cable coupling between control and commanc centers.

FIG. 9 is a schematic diagram of an embodiment of the inspection system of this invention. There are shown the camera section 66 having a panoramic lens 68 and a charge coupled array 70. The camera 66 is mounted on a cart 72 by any of the mounting means 73 discussed above. The cart includes a housing 74, a motor 76 and a control means 79.

The control means 78 transmits image signals B from camera 66 through signal transmitter 82 to remote command center 84. The image signal is sent on to data processing means 86 and presented for viewing on monitor 88.

Operator 90 issues commands to command center 84 to generate position signals A which are transmitted through signal transmission means 82 to control means 78. One section of the control means 78 is simply electronically actuated switches which control power delivered to the motor means 76 as discussed above in connection with the embodiment shown in FIG. 6.

Operator 90 also issues "picture" commands C received by data processor 86 for selecting parameters related to viewing the data on monitor 88. These parameters include selection of the area of the panoramic view to be presented, magnification of the scene, etc.

In one version (FIG. 9), the signal transmission means 82 is simply a cable connecting the command center 84 to the control center. The cable transmits the image data, the position signal, and electrical power to the motor 76.

Figure 10:
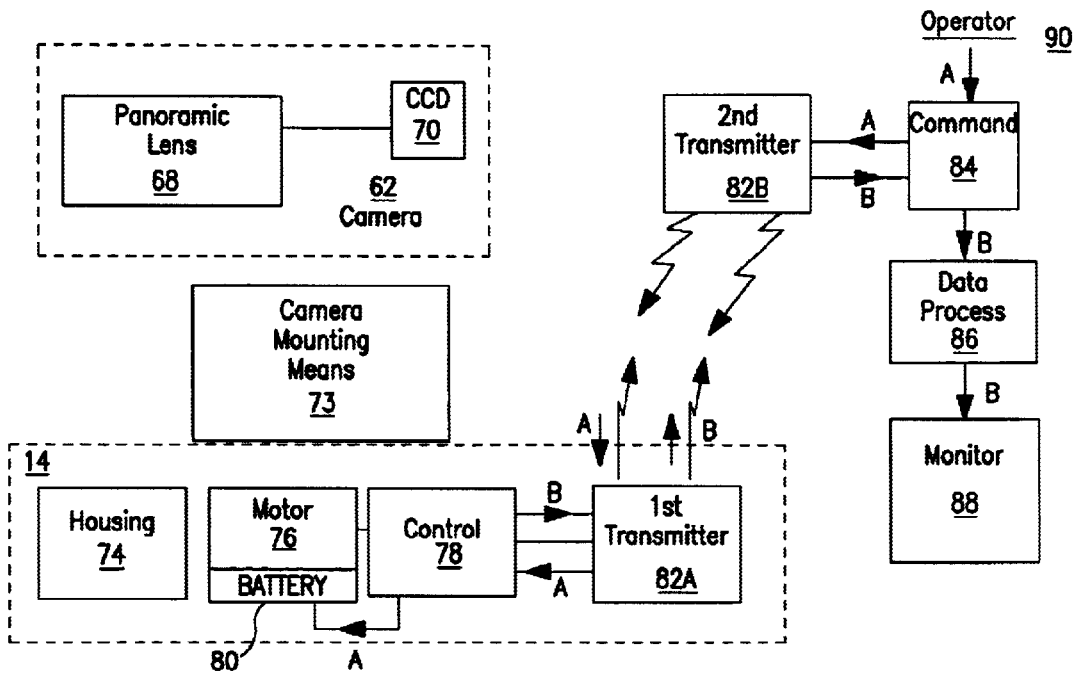
FIG. 10 is a schematic diagram of transmitter coupling of control and command centers.

In another version (FIG. 10), the signal transmission means includes a first transceiver 82A connected to control means 78 and communicating with second transceiver 82B connected to command center 84. Image and position signals are transmitted between the transceivers 82A and 82B. The motors are powered by battery 80 mounted on or contained in housing 74.

Figure 11:
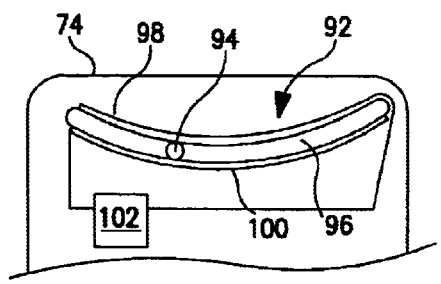
FIG. 11 shows a level sensor for detecting tilt in the cart.

FIG. 11 is a sectional view taken along line of sight 10—10 (FIG. 1) showing a level sensor 92 contained within housing 74. The level sensor 92 includes a mercury drop 94 inside a tube 96. Tube 96 has a (metal) conducting strip 98 on one side of an interior tube surface and a resistive strip 100 on an opposite side of the interior tube surface. An ohmmeter 102 has an electrical connection to the conducting strip 98 on one end of tube 96 and another connection to the resistive strip 100 on the other end of the tube 96. The ohmmeter 102 issues a "tilt" signal responsive to the measured electrical resistance which depends on the position of mercury drop 94 in tube 92. The "tilt" signal is transmitted to the control center (not shown in FIG. 10) the command center applies power to the appropriate pair of wheels (FIG. 6) so as to restore the cart to a level condition.

The technology for controlling motors and switches using microprocessors is well known to those responding to in-out commands is well known to those having ordinary skill in the art.

Figure 12:
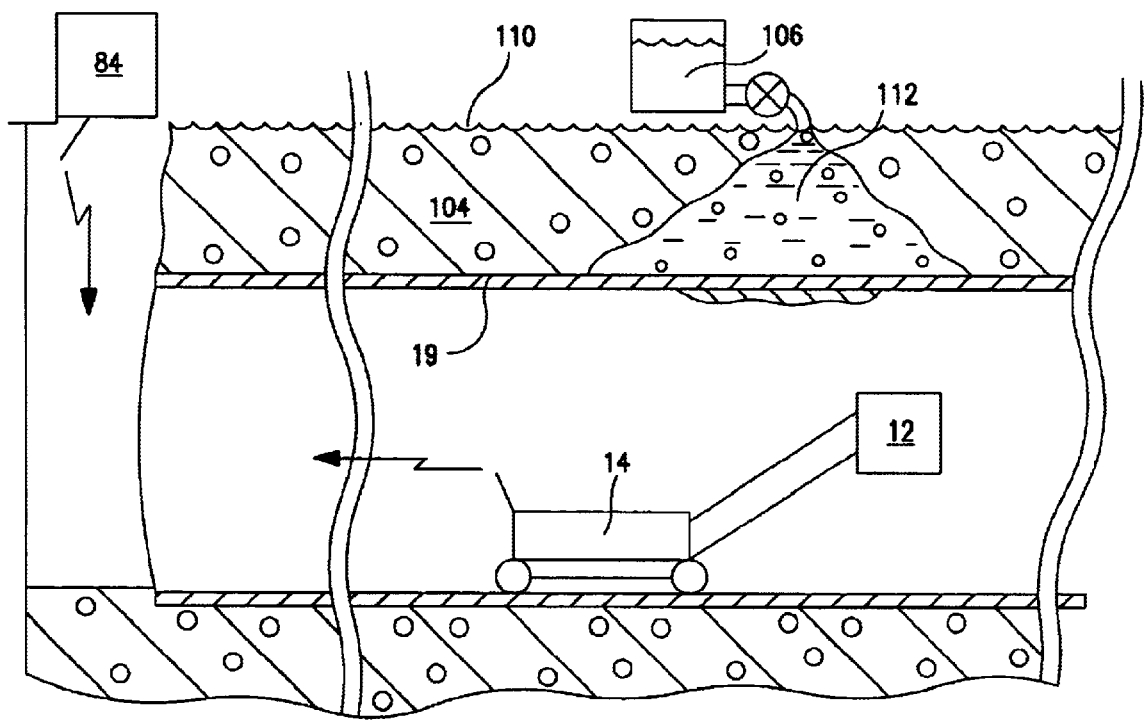
FIG. 12 shows a system for allowing a phosphorescent laced water to dreep through cracks in a pipe being investigated.

FIG. 12 shows an embodiment of the inspection system of this invention that is useful for detecting leakage such as in pipes that are underground. There is shown a cart 14 with camera 12 travelling in a pipe 19 (shown in section) underground 104. The cart 14 is under control of the command center 84 as discussed previously. A source 106 of water, laced with a phosphorescent dye is positioned on the surface 110 of the ground above the pipe from which water is allowed to flow thereby soaking the surrounding region 112. The dye laced water will penetrate through cracks in the pipe and wet the inside surface of the pipe. The camera will thereby record the pattern of water leakage through the pipe walls for further examination by the camera.

Figure 13:
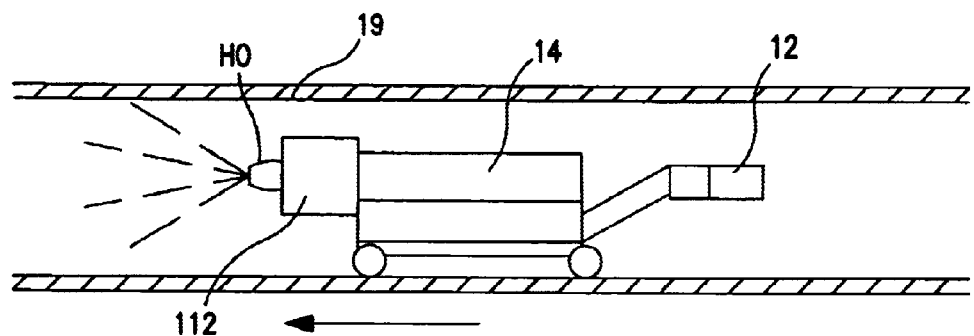
FIG. 13 shows a system for depositing a lacquer film containing phposphorescent-ferromagnetic particles to develop a view of the cracks in the pipe.

FIG. 13 shows another embodiment of the inspection system of this invention in which a lacquer laced with ferromagnetic-phosphorescent particles is sprayed on the inside of the pipe 19 from a reservoir 112. The system includes a spray unit 110 that sprays the inside surface of the pipe. Before the lacquer film dries, the ferromagnetic-phosphorescent particles coalesce predominately along the edges of cracks in the pipe. The camera, 12 equipped with a black light illuminator 14 (see FIG. 6) that causes the particles in the dried paint film to phosphoresce, illuminates the surface of the pipe so that the cracks in the pipe 19 are revealed.

Figure 14:
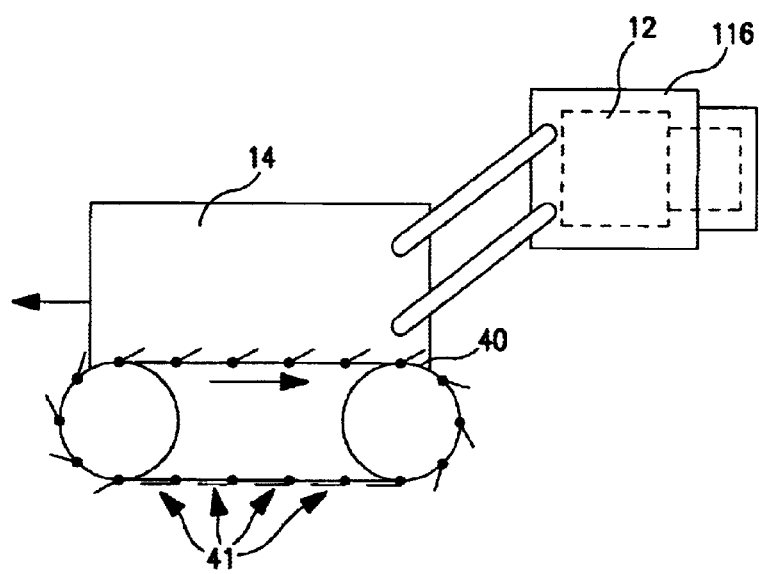
FIG. 14 shows the invention adapted for underwater use.

FIG. 14 shows another version in which the camera is contained in a water proof housing 116 and the cart 14 is contained in a water proof housing. The caterpillar treads 40 are provided with flippers 41 that rise to catch the water for propelling when the section of tread moves in one direction but which lay down when the tread moves in the (return) backwar direction. The "amphibian" Cart is thereby enabled to pass through sections of underground cavities (pipe) that are filled with water.

Variations and modifications of the invention may be contemplated after reading the specification and studying the drawings which are within the scope of the invention.

For example, while the embodiment of FIG. 12 shows the spray unit as being attached to the cart,14, in another embodiment, the spray unit is detached from the cart and mounted on its own separate cart.

Figures 15A, 15B:
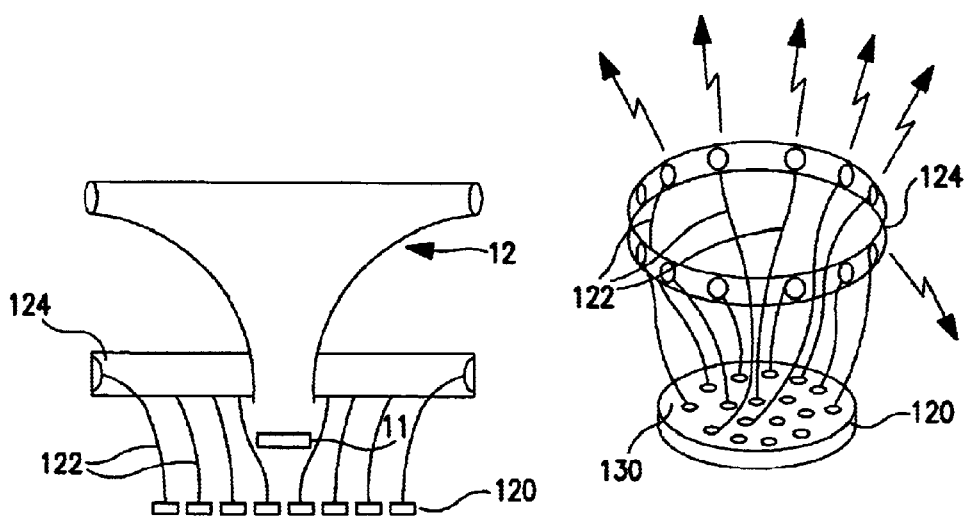
FIGS. 15A and 15B show LED uniform illumination of the field of view.

FIG. 15A is a secional view showing another version for providing uniform illumination on the field of view surrounding the lens 12. FIG. 15B shows the illuminating device in perspective. There are shown the lens 12 and the CCD array 11. There is also shown, mounted concentric with the lens, a bank 120 of "super bright" LEDs. The light from each LED is collected at one end of an optical pipe 122 whose other end is connected to a an opening in a collar 124 that is concentric with the lens 12. The light from the ends of all of the optical pipes is directed radially outward from the collar and illuminates the surrounding field of view of the camera.

In view of these variations and modifications of the invention, it is therefore desired to define the scope of the invention by the appended claims.

What is claimed is:

1. A mobile inspection system for presenting an inspected view on a monitor which comprises:
   a camera including:
   (a.) a panoramic lens having a field of view being a band that concentrically encircles an axis of said panoramic lens;
   (b.) an array of charge coupled elements arranged for receiving an image signal representing an image of said field of view transmitted through said panoramic lens
   an image data processing circuit arranged to receive said image signal and display a selected portion of said image on a monitor,
   a cart including:
   (a) a housing;
   (c.) motor means mounted on said housing for moving said cart in said direction; said motor means responsive to position signals for controlling motion of said cart;
   (d) means for mounting said camera on said housing with said axis parallel to a selected direction;
   a command means remote from said cart configured for receiving image signals and transmitting said image signals to said image processing center and generate position signals initiated by an operator,
   control means mounted in said housing and coupled to said array for receiving said image data;
   said control means connected to said motor means for controlling motion of said cart in response to position signals received by said control means;
   signal transmission means for transmitting position signals from said command means to said control means and for transmitting image data from said control means to said command means.

2. The inspection system of claim 1 wherein said direction is perpendicular to said base surface.

3. The inspection system of claim 1 wherein said direction is selectably variable between a direction that is perpendicular to said base surface and a direction that is parallel to said base surface.

4. The inspection system of claim 1 wherein said direction is parallel to said base surface.

5. The system of claim 4 wherein said means for mounting is constructed to permit selection of a distance between said base surface and said axis of said lens.

6. The system of claim 5 wherein said distance is a radius of a pipe providing that when said cart is positioned in said pipe, said system presents a panoramic view of an interior surface of said pipe.

7. The system of claim 5 wherein said means for mounting said camera on said housing comprises at least two legs parallel to each other, each leg having one end hingably attached to said camera and another end hingably mounted on said housing and operably arranged to maintain said axis parallel to said direction and to permit adjustment of a distance between said base surface and said axis.

8. The system of claim 7 which comprises a rotary actuator coupled to at least one of said legs for orienting said legs at a desired inclination.

9. The system of claim 7 wherein means for mounting said camera on said housing with said axis parallel to said direction comprises a leg of at least two sections, said sections telescoping together with one end of said leg secured to said camera and another end of said leg mounted on said housing.

10. The system of claim 1 wherein said means adapted for supporting said housing comprises two pairs of wheels, one pair of of said two pair of wheels respectively on one side of said housing and another pair of wheels on an opposite side of said housing.

11. The system of claim 10 wherein said motor control means includes switching means for:
   (a.) driving both pairs of wheels to move said cart in a forward direction;
   (b.) driving both pairs wheels to move said cart in a rearward direction;
   (c.) driving each pair of wheels in a direction opposite said other pair of wheels whereby said cart is driven in a turning direction.

12. The system of claim 1 wherein said means adapted for supporting said housing comprises a pair of caterpillar treads and two pairs of wheels, each tread mounted on one pair of said two pair of wheels respectively, one caterpillar tread on one side of said housing and another caterpillar tread on an opposite side of said housing.

13. The system of claim 12 wherein said motor control means includes switching means for:
   (a.) driving both pairs of wheels to move said cart in a forward direction;
   (b.) driving both pairs wheels to move said cart in a rearward direction;
   (c.) driving each pair of wheels in a direction opposite said other pair of wheels whereby said cart is driven in a turning direction.

14. The system of claim 10 wherein said motor means comprises two motors, one of said two motors coupled to one said pair of wheels and another one of said two motors coupled to said other pair of wheels.

15. The system of claim 10 wherein said motor means comprises a first variable transmission means connecting said motor to said first pair of wheels;
   a second variable transmission connecting said motor to said second pair of wheels.

16. The system of claim 1 wherein said motor means comprises a battery housed within said housing and connected to power said motor means.

17. The system of claim 1 wherein said motor means comprises power transmission means adapted for connection to an external source of power.

18. The system of claim 1 wherein said command means comprises:
   means for generating a desired position signal corresponding to motion of said cart selected by an operator of said system; and
   means for transmitting said desired position signal to said control means; and
   said control means positioned within said housing and arranged to control power delivered to said motor means responsive to said position signal.

19. The system of claim 1 wherein said means for transmitting said image signal from said array to said image data processing system and said position signal from said command center to said control center comprises:
   (a.) a first transceiver connected to said control for sending image data to a remote second transmitter and receiving instructions from said second transmitter to operate said motor means;
   (b.) a second transceiver connected to said command center for receiving image data from said first transceiver and sending instructions from said command center to operate said motor means.

20. The system of claim 1 wherein said means for transmitting said image signal from said array to said image data processing system and said position signal from said command center to said control center comprises a cable connecting said control center to said command center.

21. The system of claim 1 which further comprises;
a level sensing means for generating a signal representing angle of tilt of said cart about an axis perpendicular to said direction;
said control center coupled to said level sensing means for transmitting said signal representing angle of tilt to said command center.

22. The system of claim 1 wherein a subject to be inspected comprises a cavity defined by a wall having an interior surface within a region and said system further comprises:
a source of water laced with a phosphorescent dye;
means for dispensing said water in said region surrounding said cavity whereby said camera, transported into said cavity by said cart is enabled to form an image of a water covered area of said interior surface by virtue of phosphorescent light emitted from said water that has seeped into said cavity and covered said water covered area.

23. The system of claim 21 wherein said cavity is a pipe whereby said camera is enabled to form an image of cracks in said pipe.

24. The system of claim 1 further comprising a light means arranged for illuminating surroundings of said camera.

25. The system of claim 24 wherein said light means comprises
a hemispherical reflector;
a clear transparent cylinder enclosing said hemispherical reflector
a cylindrical light bulb mounted on an end of said clear transparent cylinder coaxial with said hemispherical reflector and cylinder whereby light generated by said bulb is unobstructed to shine on and is reflected by said field of view;
said array of charge coupled elements arranged on a plane perpendicular to said axis to receive light from said field of view reflected from said reflector providing that said light reflected from said field of view passes through the clear plastic cylinder 26, and is reflected by hemispherical reflector and is focussed by said focussing means onto said charge coupled device surface;
electrical wires for energizing said bulb positioned along said axis of said camera through an opening in the center of said reflector 28 and focussing means providing that said wires avoid casting a shadow that would otherwise interfere with formation of the image of the pipe surface.

26. The system of claim 24 wherein said light means is positioned at a location on one side of said array opposite another side of said array, said lens being positioned on said another side of said array.

27. The system of claim 1 which further comprises:
a reservoir means for storing lacquer containing ferromagnetic-phosphorescent particles;
means for spraying said lacquer onto a surface;
said camera positioned to form image signals of said surface.

28. The system of claim 27 wherein said reservoir and sprayer are mounted on said cart.

29. The system of claim 1 further comprising:
said housing being sealed to prevent penetration of water into an interior of said housing;
said camera being sealed to prevent penetration of water into an interior of said housing.

30. A mobile inspection system for presenting an inspected view on a monitor which comprises:
a camera including:
(a.) a panoramic lens having a field of view being a band that concentrically encircles an axis of said panoramic lens;
(b.) an array of charge coupled elements arranged for receiving an image signal representing an image of said field of view transmitted through said panoramic lens;
(c.) an image data processing circuit arranged to receive said image signal and adapted to display a selected portion of said image on a monitor;
a cart including:
(a) a housing;
(b) means adapted for supporting said housing on a base surface and constructed to permit said cart to move in a direction parallel to said base surface;
(c.) motor means mounted on said housing for moving said cart in said direction;
said motor means adapted for connection to a means for controlling motion of said cart;
(d) means for mounting said camera on said housing with said axis parallel to a selected direction.

31. The system of claim 30 further comprising:
a plurality of LED light sources;
a plurality of optical pipes, one optical pipe for each one LED light source;
each optical pipe having one end arranged to collect light from a respective LED light source and another end being one of an array of ends of other ends of said plurality of optical pipes;
said array of ends arranged to form a circle of said ends radiating light in a radial direction;
said circle of said ends arranged concentric with said panoramic lens whereby said band surrounding said camera is uniformly illuminated.

32. A panoramic camera which comprises:comprising:
a camera including:
(a.) a panoramic lens having a field of view being a band that concentrically encircles an axis of said panoramic lens;
(b.) an array of charge coupled elements arranged for receiving an image signal representing an image of said field of view transmitted through said panoramic lens;
(c.) an image data processing circuit arranged to receive said image signal and adapted to display a selected portion of said image on a monitor,
a plurality of LED light sources;
a plurality of optical pipes, one optical pipe for each one LED light source;
each optical pipe having one end arranged to collect light from a respective LED light source and another end being one of an array of ends of other ends of said plurality of optical pipes;
said array of ends arranged to form a circle of said ends radiating light in a radial direction;
said circle of said ends arranged concentric with said panoramic lens whereby said band surrounding said camera is uniformly illuminated.

* * * * *

UNITED STATES PATENT AND TRADEMARK OFFICE
CERTIFICATE OF CORRECTION

PATENT NO. : 6,621,516 B1
DATED : September 16, 2003
INVENTOR(S) : T. Wasson, S. Montemayor and R. S. Smith It is certified that error appears in the above-identified patent and that said Letters Patent is hereby corrected as shown below:

<u>Column 1,</u>
Line 17, please insert -- on a base surface -- between "cart" and "; said".

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 6,621,516 B1
DATED          : September 16, 2003
INVENTOR(S)    : T. Wasson et al.

It is certified that error appears in the above-identified patent and that said Letters Patent is hereby corrected as shown below:

<u>Column 7</u>
Line 17, after "said cart", insert -- on a base surface -- add -- said motor means respons- --

Signed and Sealed this

Third Day of August, 2004

JON W. DUDAS
*Acting Director of the United States Patent and Trademark Office*